(12) United States Patent
Younger (10) Patent No.: US 9,335,809 B2
(45) Date of Patent: May 10, 2016

(54) VOLATILE MEMORY STORING SYSTEM DATA DURING LOW POWER MODE OPERATION AND MONITORING THE VOLTAGE SUPPLIED TO THE MEMORY DURING LOW POWER MODE

(71) Applicant: Seagate Technology LLC, Cupertino, CA (US)

(72) Inventor: Scott Thomas Younger, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 280 days.

(21) Appl. No.: 13/844,392

(22) Filed: Mar. 15, 2013

(65) Prior Publication Data

US 2014/0281625 A1    Sep. 18, 2014

(51) Int. Cl.
*G06F 1/00* (2006.01)
*G06F 1/32* (2006.01)
*G06F 1/28* (2006.01)

(52) U.S. Cl.
CPC ............ *G06F 1/3206* (2013.01); *G06F 1/3203* (2013.01); *G06F 1/3215* (2013.01); *G06F 1/3268* (2013.01); *G06F 1/3287* (2013.01); *G06F 1/28* (2013.01)

(58) Field of Classification Search
CPC .... G06F 1/3203; G06F 1/3215; G06F 1/3287
See application file for complete search history.

(56) References Cited

U.S. PATENT DOCUMENTS

| | | | |
|---|---|---|---|
| 4,819,237 A * | 4/1989 | Hamilton | G06F 11/0763 714/22 |
| 5,544,138 A | 8/1996 | Bajorek et al. | |
| 5,920,726 A | 7/1999 | Anderson | |
| 5,935,242 A * | 8/1999 | Madany | G06F 9/4411 713/1 |
| 6,401,193 B1 | 6/2002 | Afsar et al. | |
| 6,711,675 B1 * | 3/2004 | Spiegel | G06F 9/4401 713/164 |
| 6,720,673 B2 | 4/2004 | Blanco et al. | |
| 6,795,876 B1 | 9/2004 | Solomon | |
| 7,017,078 B2 | 3/2006 | Frimout | |
| 7,181,565 B2 | 2/2007 | Surico et al. | |
| 7,191,327 B2 | 3/2007 | Viljoen et al. | |

(Continued)

OTHER PUBLICATIONS

Lee, et al., "A fast, high-endurance and scalable non-volatile memory device made from asymmetric Ta2O5_x/TaO2_x bilayer structures,"Nature Materials, Jul. 10, 2011, pp. 1-6, DOI: 10.1038/NMAT3070; Macmillan Publishers Limited.

*Primary Examiner* — Mohammed Rehman
*Assistant Examiner* — Gayathri Sampath
(74) *Attorney, Agent, or Firm* — Hall Estill Attorneys at Law (57) ABSTRACT

Apparatus and method for operating a device in a low power mode. In accordance with some embodiments, the apparatus comprises a memory and a system on chip (SOC) integrated circuit. The SOC has a first region with a processing core and a second region electrically isolated from the first region as an always on domain power island with a power control block. In response to a sleep command, the processing core transfers system data to the memory and the power control block enters a low power mode in which no electrical power is supplied to the first region. In response to a wake up command, power is restored to the first region and the processing core performs a reinitialization operation responsive to status information communicated by the power control block indicative of a state of the system during the low power mode.

18 Claims, 6 Drawing Sheets

(56) References Cited

U.S. PATENT DOCUMENTS

| | | |
|---|---|---|
| 7,254,732 B2 | 8/2007 | Bashford et al. |
| 7,295,462 B2 | 11/2007 | Farnworth |
| 7,380,059 B2 | 5/2008 | Burton |
| 7,506,335 B1 | 3/2009 | Wooff et al. |
| 7,539,048 B2 | 5/2009 | Farnworth |
| 7,542,091 B2 | 6/2009 | Bean et al. |
| 7,797,525 B2 | 9/2010 | Lee et al. |
| 7,873,059 B2 | 1/2011 | Morita et al. |
| 7,904,604 B2 | 3/2011 | Lum et al. |
| 7,911,840 B2 | 3/2011 | Wu et al. |
| 7,930,485 B2 | 4/2011 | Fertig et al. |
| 7,937,602 B2 | 5/2011 | Elliott et al. |
| 7,941,682 B2 | 5/2011 | Adams |
| 8,027,207 B2 | 9/2011 | Fifield et al. |
| 8,028,155 B1 | 9/2011 | Righi et al. |
| 8,077,520 B1 | 12/2011 | Yang et al. |
| 8,095,851 B2 | 1/2012 | Diggs et al. |
| 8,127,167 B2 | 2/2012 | Wang et al. |
| 8,150,801 B2 | 4/2012 | Srivastava et al. |
| 8,159,869 B2 | 4/2012 | Park et al. |
| 8,199,603 B2 | 6/2012 | Chung et al. |
| 8,258,844 B2 | 9/2012 | Elrod et al. |
| 8,291,251 B2 | 10/2012 | Rausehmayer et al. |
| 2003/0172135 A1 | 9/2003 | Bobick et al. |
| 2006/0242458 A1* | 10/2006 | Feldman ............. G06F 11/1441 714/14 |
| 2008/0098244 A1 | 4/2008 | Clinton et al. |
| 2008/0155331 A1 | 6/2008 | Rothman et al. |
| 2008/0162079 A1 | 7/2008 | Astigarraga et al. |
| 2008/0276105 A1* | 11/2008 | Hoberman et al. ............ 713/300 |
| 2009/0132838 A1* | 5/2009 | Cherian ................ G06F 1/3203 713/320 |
| 2009/0201082 A1* | 8/2009 | Smith et al. .................... 327/544 |
| 2010/0023870 A1 | 1/2010 | Baker |
| 2010/0027327 A1 | 2/2010 | Chung et al. |
| 2010/0109633 A1* | 5/2010 | Sofer et al. ..................... 323/313 |
| 2010/0308897 A1* | 12/2010 | Evoy et al. ..................... 327/530 |
| 2011/0058440 A1* | 3/2011 | Smith .................... G11C 5/141 365/229 |
| 2011/0075473 A1 | 3/2011 | Park et al. |
| 2011/0188292 A1 | 8/2011 | Joo et al. |
| 2012/0072639 A1 | 3/2012 | Goss et al. |
| 2012/0151162 A1 | 6/2012 | Trantham et al. |
| 2012/0221576 A1 | 8/2012 | Marquardt et al. |
| 2012/0260159 A1 | 10/2012 | Lazier et al. |
| 2012/0284230 A1 | 11/2012 | Adkins et al. |

* cited by examiner

FIG. 11

VOLATILE MEMORY STORING SYSTEM DATA DURING LOW POWER MODE OPERATION AND MONITORING THE VOLTAGE SUPPLIED TO THE MEMORY DURING LOW POWER MODE

SUMMARY

Various embodiments of the present disclosure are generally directed to a method and apparatus for operating a device in a low power mode.

In accordance with some embodiments, the apparatus comprises a memory and a system on chip (SOC) integrated circuit. The SOC has a first region with a processing core and a second region electrically isolated from the first region as an always on domain power island with a power control block. In response to a sleep command, the processing core transfers system data to the memory and the power control block enters a low power mode in which no electrical power is supplied to the first region. In response to a wake up command, power is restored to the first region and the processing core performs a reinitialization operation responsive to status information communicated by the power control block indicative of a state of the system during the low power mode.

These and other features and aspects which characterize various embodiments of the present disclosure can be understood in view of the following detailed discussion and the accompanying drawings.

DETAILED DESCRIPTION

The present disclosure generally relates to power management in an electronic device, and more particularly to a novel "always on" power island configuration to support a low power mode of operation for the device.

It can be highly desirable in electronic devices to achieve significant power consumption reductions by placing the devices in a reduced power mode. So-called low power mode (LPM) generally refers to a power state in which power consumption is held at a very low level, but the device is still able to decode a communicated signal to resume operation. Conceptually, LPM may be thought of as a power state that is just above a completely powered off state.

A challenge with implementing LPM schemes is the fact that many circuits leak when power is applied, particularly in complex circuits such as application specific integrated circuits (ASICs), field programmable gate arrays (FPGAs), etc. These and other types of complex circuits, all of which will generally be referred to herein as systems on a chip ("SOC"), can have millions of transistors and other active and passive elements. It can be difficult to reduce power in such devices while continuing to supply voltage due to the myriad opportunities for leakage paths through the circuitry.

Achieving LPM operation in a data storage device can be particularly difficult. Data storage devices, such as hard disc drives (HDDs) or solid state drives (SSDs), often utilize an SOC integrated circuit that operates as a storage controller. Such controllers require power to be applied to significant portions of the circuitry even during low power modes of operation. This is because there is no capability in the SOC architecture to restore power once the SOC itself is powered off. Some SOC functionality is thus required to enable the system to detect a wakeup command and resume normal operation.

External control circuitry, such as an external microcontroller, can be used to reawaken the main SOC, but this type of solution generally requires additional hardware which tends to adds cost, components, complexity and space. Many current generation LPM designs leave the SOC energized and attempt to optimize power consumption around this paradigm.

Other limitations that can be associated with current generation LPM designs include the requirement for multiple power-management interfaces (e.g. serial interface (SIF) signals, multiple general purpose input/output (GPIO) signals, etc.) to control power for the system, which can result in multiple modes and duplicated functionality. Multiple interfaces increase the firmware (FW) and system management differences that need to be accommodated. Other limitations include the fact that voltage regulators are often not individually programmable and therefore cannot always be individually disabled. Serial interface (SIF) control systems generally need to remain powered at all times, which further tends to increase power consumption levels of a device.

Various embodiments of the present disclosure are generally directed to an apparatus and method for operating a device, such as but not limited to a data storage device, in a low power mode (LPM). As explained below, a system on chip (SOC) is provided with a first region having a processing core and a second region electrically isolated from the first region and characterized as an always on domain (AOD) power island. A cooperative interface is connected to the SOC and communicates with the AOD. The interface includes an LPM module with a main power switch which, when opened, powers down remaining portions of the SOC and, as required, other aspects of the overall device. The AOD and the LPM module are continuously powered from an external source, such as an input host power terminal at all times power is supplied to the device.

A command is received by the device from a host or other source to signal the device to enter a reduced power consumption mode (e.g., a sleep command). The processing core operates in response to the received sleep command to store data to one or more volatile and/or non-volatile memories in preparation for low power mode in which power is removed from the first region of the SOC (including the processing core). The stored data can take a variety of forms including, but not limited to, user data, metadata, state data, calibration data, and authentication data. In some embodiments, the processing core generates and/or stores error correction codes (ECC) to enhance integrity of the data. For reference, ECC is defined broadly to describe codes or other values adapted to allow the system to detect and/or correct at least one bit error in a data set.

The processing core next issues a ready command to the AOD, which opens the main switch thereby deactivating the first region of the SOC including the processing core. This initiates the low power mode.

The AOD monitors a variety of signals during the low power mode including a supply voltage supplied by the host and used by the AOD. Voltage fluctuations, if any, are noted. The AOD further monitors for a wake up signal from a variety of sources. Detection of a voltage fluctuation of significant magnitude, and/or detection of a wake up signal, causes the AOD to close the main switch thereby resuming application of power to the first region of the SOC, including the processing core.

The processing core receives status information from the AOD at the conclusion of the low power mode, and initiates a higher power mode accordingly, such as normal operation. Depending upon the extent to which voltage fluctuations or other events were detected during the low power mode by the AOD, the processing core may utilize the data stored in the memory as part of the reinitialization process (e.g., warm boot), or may elect to jettison the data and reinitialize the entire system afresh (e.g., cold boot).

Figure 1:
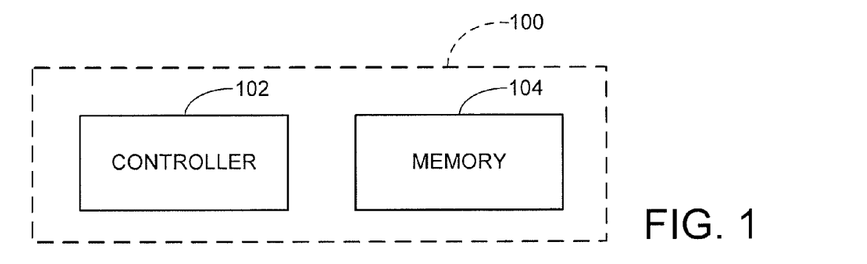
FIG. 1 is a functional representation of a data storage device.

These and other features and advantages of various embodiments can be understood beginning with a review of FIG. 1 which provides a simplified functional representation of a data storage device 100. The device 100 includes a controller 102 and a memory 104. The controller 102 can take a variety of forms such as a system on a chip (SOC) with programmable processing capabilities using firmware stored in a suitable memory location.

The memory 104 can take a variety of forms and can be used to store user data from a host device (not separately shown). The functionality of the controller 102 and the memory 104 can be incorporated into a single chip, or distributed among different integrated circuit devices and other components (e.g., solid state memory, rotatable memory, etc).

Figure 2:
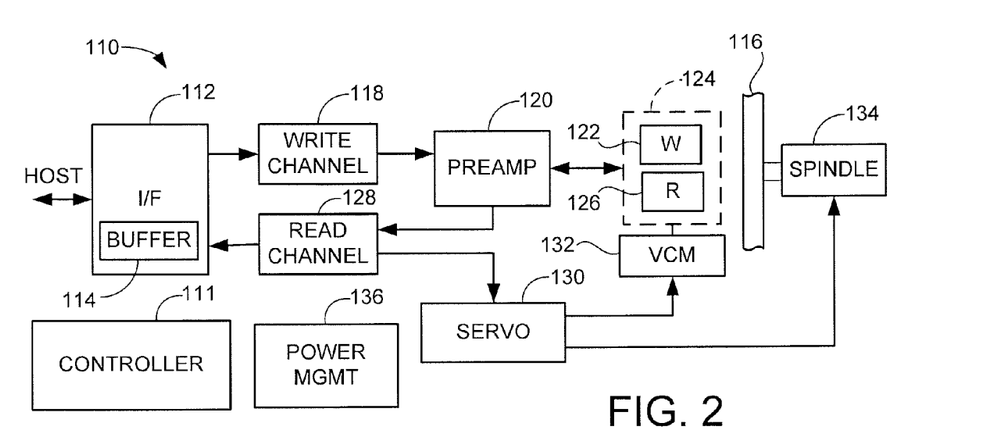
FIG. 2 is a functional representation of another data storage device.

FIG. 2 is a functional block diagram for a data storage device 110 that corresponds to the device 100 of FIG. 1 in some embodiments. The data storage device 110 is characterized for purposes of the present disclosure as a hard disc drive (HDD) that employs magnetic recording to store data to one or more rotatable magnetic recording discs.

The device 110 in FIG. 2 includes a top level controller (SOC) 111. An interface circuit (I/F) 112 communicates with the host device and includes a data buffer 114 to temporarily store data pending transfer between the host device and a rotatable perpendicular data recording medium 116.

A write channel 118 operates to encode input write data from the host to provide a serialized data stream to a preamplifier/driver (preamp) 120. The preamp 120 provides a sequence of write currents to a magnetic write element (W) 122 of a data transducer 124 to write data to the medium 116.

During a readback operation, readback signals are transduced by a magneto-resistive (MR) read element (R) 126 of the data transducer 124. The transduced signals are supplied to the preamp 120. The preamp 120 conditions and amplifies the readback signals and provides the same to a read channel 128. The read channel 128 applies signal processing techniques to recover the originally stored data to the buffer 114 pending subsequent transfer to the host.

During both read and write operations, specially configured servo positioning data on the medium 116 are transduced by the read element 126 and, after demodulation by a portion of the read channel 128, are supplied to a servo control circuit 130. The servo control circuit 130 provides positional control signals to a voice coil motor (VCM) 132 coupled to the data transducer 124 to position the respective write and read elements 122, 126 adjacent various data tracks defined on the medium 116.

The servo control circuit 130 further provides control inputs to a spindle motor 134 which rotates the medium 116 during operation. To avoid damage to the device 110, the servo circuit 130 moves the transducer(s) 124 to a safe parking position, such as on a ramp structure or a landing zone, prior to deactivation of the spindle motor 134.

FIG. 2 further depicts a power management circuit 136. The power management circuit 136 operates to supply electrical power to the various constituent elements of the device. While shown as a separate functional block, portions of the power management circuit 136 may be physically incorporated into other blocks of FIG. 2, such as in the controller 111. The construction and operation of the power management circuit 136 in accordance with various embodiments will be discussed in greater detail below.

Figure 3:
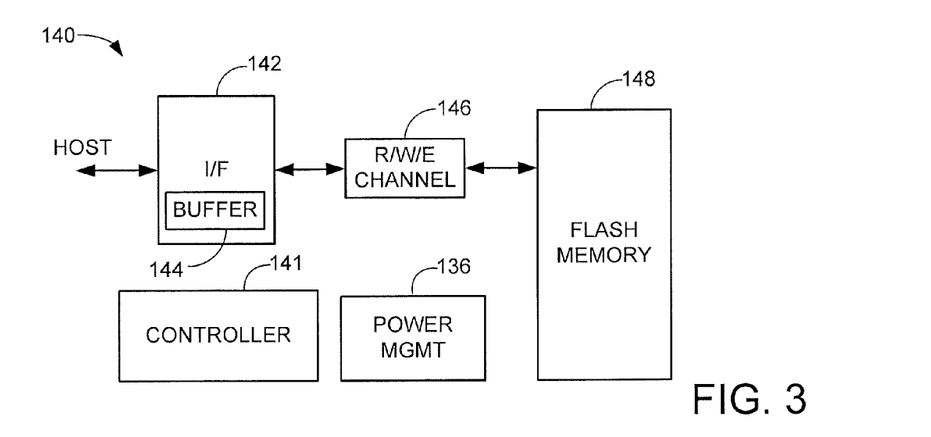
FIG. 3 is a functional representation of another data storage device.

FIG. 3 is a functional block diagram for another data storage device 140 that corresponds to the device 100 of FIG. 1 in some embodiments. The data storage device 140 is characterized as a solid state drive (SSD) that employs non-volatile flash memory to store data from the host device. Other forms of solid state memory, such as STRAM (spin torque transfer random access memory), RRAM (resistive random access memory), PCRAM (phase change random access memory), etc. may be used as desired.

As with the HDD device 110 of FIG. 2, the SSD device 140 of FIG. 3 includes a top level controller (SOC) 141 and an I/F circuit 142 with a data buffer 144. A read/write/erase (R/W/E) channel 146 provides read, write and erasure capabilities for one or more flash memory arrays 148. The SSD device 140 includes the aforementioned power management circuit 136 to selectively provide electrical power to the various constituent elements in the device.

It is contemplated that each of the storage devices of FIGS. 1-3 are adapted to operate in a variety of different power modes. These power modes can be arranged in a hierarchy from a lowest mode (deactivated or "off") to a highest mode (normally operating or "fully on"). Various intermediate power mode levels can be defined between these lowest and highest modes. The intermediate power mode levels represent reduced power mode levels of operation in which the device consumes less power than during normal operation.

The savings in power consumption provided by a reduced power mode is offset by an increased response time for the device to transition back and resume normal operation. Generally, the lower the power mode, the longer the device will need to be able to return to an operationally ready state and begin processing access commands from the host.

With regard to the HDD device 110 of FIG. 2, it can be seen that different elements may have different power consumption requirements. Successively lower power modes can be achieved by deactivating (turning off) different elements, or combinations of elements in the device. For example, one or more reduced power modes may be obtained by parking the transducer(s) 124, turning off associated circuits such as the read/write channels 118 and 128, the preamp 120 and the servo circuit 130, turning off the spindle motor 134, etc.

Similarly, the SSD device 140 in FIG. 3 can be transitioned to various reduced power modes by selectively deactivating different elements such as the R/W/E channel 146 and the flash memory 148. These reduced power levels are established by the respective power management circuits 136 and can be referred to by various labels such as a "standby mode," a "sleep mode," etc.

A low power mode (LPM) mode is additionally contemplated for the devices of FIGS. 1-3. As disclosed herein, LPM is just above being fully turned off in terms of power consumption, and is achieved by turning off substantially all of the functionality of the respective controllers 111, 141 and interface circuits 112, 142 as shown in FIGS. 2 and 3. It has been found in some cases that LPM power consumption levels of around 12.5 milliwatts, mW ($1.25 \times 10^{-6}$ W) or less are attainable using the systems disclosed herein.

Figure 4:
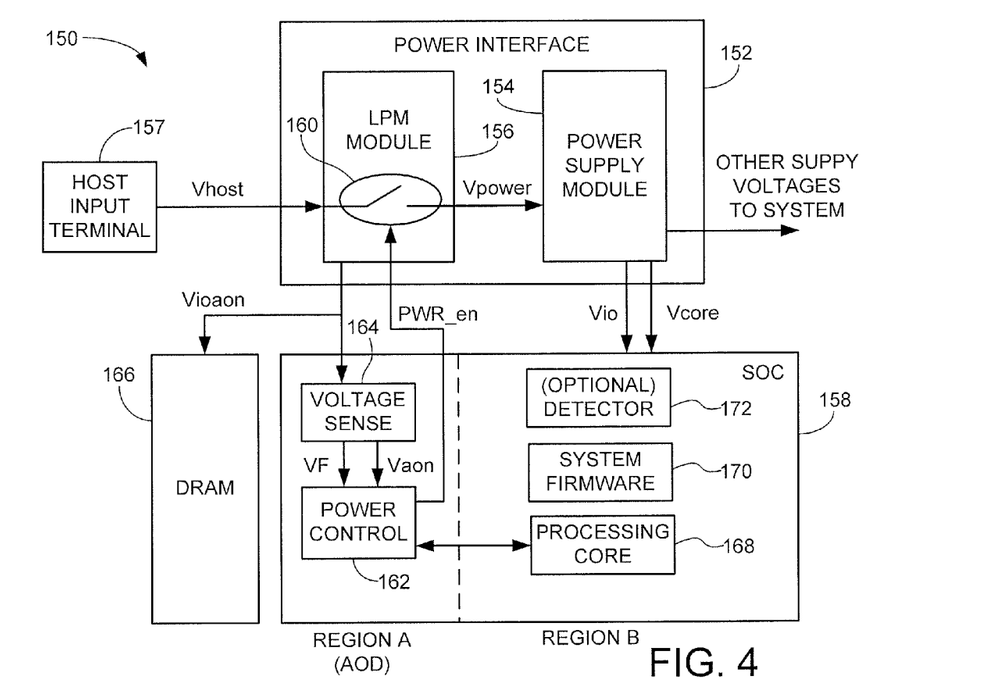
FIG. 4 depicts a power management circuit of the devices of FIGS. 1-3 in accordance with some embodiments of the present disclosure.

FIG. 4 is a functional block representation of relevant portions of a power management circuit 150 generally similar to the power management circuit 136 of FIGS. 2-3. While the circuit 150 can be adapted to supply power to the respective storage devices of FIGS. 1-3, the circuit can be used in other types of operational environments as well. The circuit 150 can be used to enact a variety of power modes for the associated device, including a fully powered mode, an off mode, at least one or more intermediate modes such as a sleep mode and a standby mode, and a low power mode.

The power management circuit 150 includes a power interface 152. The power interface 152 includes a main power supply module 154 and a low power mode (LPM) module 156. For reference, the main power supply module 154 will sometimes be referred to as a "first" power supply module, and the LPM module 156 will sometimes be referred to as a "second" power supply module. These respective modules 154, 156 may be separate components or may be integrated into a common semiconductor die.

The power interface 152 receives electrical power (e.g., voltage Vhost) from a host input terminal 157 associated with the host device. The interface uses this input host power to supply electrical power to other circuits and components, including a system on chip (SOC) 158. The voltage Vhost can be any suitable value, such as nominally +5V, +12V, etc. Multiple input host voltages can be concurrently supplied as desired.

The power supply module 154 incorporates a number of voltage regulators, logic and other elements to supply various supply (rail) voltages at various magnitudes. Both negative and positive voltages may be supplied. These various voltages are represented by voltage Vio which is a switchable data I/O voltage rail such as +12V, +5V, +3.3V, +2.5V, +1.8V, etc., and voltage Vcore which is a switchable core circuitry voltage rail such as +0.9V, etc.

The LPM module 156 includes a main power switch, represented at 160, which can take the form of a power transistor or other circuit element(s). The LPM module 156 receives the input host voltage Vhost and, when the switch 160 is closed, provides a corresponding voltage Vpower to the power supply module 154. It will be appreciated that other configurations for the main switch can be used, including as a switching input to one or more switchable power regulators that can be individually or collectively powered up or down.

The power management circuit 150 further includes an always on domain (AOD) power island, denoted generally as Region A in the SOC 158. The AOD includes a power control block 162 and a voltage sense circuit 164. The power control block 162 and the voltage sense circuit 164 are integrated into the circuitry of the SOC 158. More specifically, the power control block 162 and the voltage sense circuit 164 occupy a first region (Region A) of the SOC 158. The remainder of the SOC is identified as a second region (Region B).

Region A is electrically isolated from Region B. For reference, Region B may take a variety of configurations including additional power islands (not separately shown), but generally, Region B will be contemplated as constituting the majority of the overall SOC, and Region A will be contemplated as constituting a relatively small portion of the overall SOC.

The LPM module 156 supplies a voltage Vioaon to the voltage sense circuit 164, which in turn supplies a voltage Vaon to the power control block 162. The voltages Vioaon and Vaon represent rail voltages that are always on so long as the Vhost voltage continues to be supplied to the device. The voltages Vioaon and Vaon may have voltage magnitudes that corresponds to the Vio voltage magnitude, or may take some other suitable voltage levels. In some cases, Vaon may nominally have the same magnitude as Vioaon, or Vaon and Vioaon may be different including situations where Vioaon>Vaon and Vioaon<Vaon.

In some cases, the voltage Vioaon is further supplied to other components, such as an external volatile memory 166. The volatile memory 166 is characterized as a dynamic random access memory (DRAM) and may serve as a memory space available to the SOC. For example, the DRAM memory 166 may constitute the data buffers 114, 144 of FIGS. 2-3, or some other memory of the device. Alternatively, internal volatile memory (not separately shown in FIG. 4) may be incorporated into the AOD. This separate memory, which may take the form of static random access memory (SRAM) or other configuration, may remain powered during the LPM period, may be powered off during the LPM period, or may enter a lower power mode at a lower power consumption state. Non-volatile memory (also not shown in FIG. 4) may also be employed and incorporated into the AOD. These respective memory devices can be used to store state information useful by the SOC at the conclusion of the LPM period, as explained below.

The power control block 162 provides a power enable PWR_en signal to selectively open and close the switch 160 of the LPM module 156. The voltage sense circuit 164 monitors the voltage Vioaon and, as required, supplies a voltage fault (VF) signal (and other signals as well) to the power control block 162 indicating a voltage fault during the LPM period. For reference, the PWR_en signal may be considered a disable signal when transitioning the switch 160 to the open state, and a power enable signal when transitioning the switch to the closed state.

A processing core 168 of the SOC 158 is active during all modes of powered operation except for the low power mode. The processing core 168 may utilize system firmware 170, stored on-chip or elsewhere, to provide system control such as commands to initialize and operate the system, commands to the power interface 152 to selectively energize or turn off different aspects of the device to enact a reduced power mode level, and so on. Optionally, the second region (Region B) may further include a detector 172 adapted to detect power level command signals from the host, including wake up commands to transition to the normal power mode and sleep commands to transition to a reduced power mode. As explained below, receipt of a host sleep command is one command path whereby the low power mode may be ultimately initiated by the AOD.

The Region B portion of the SOC 158, including the processing core 168, is specifically deactivated and receives no electrical power during LPM periods. By contrast, the Region A of the SOC 158 (e.g., the power control block 162 and the voltage sense circuit 164) remains active during all modes including LPM periods, at least so long as viable power continues to be supplied from the host (e.g., Vhost).

As will be appreciated, the AOD (Region A) is a power island within the SOC 158. A power island can be understood as a region of logic in a circuit device that is electrically isolated from other regions of the circuit device in such a way that the power island can remain electrically energized while the rest of the circuit device is de-energized without damaging the circuit device, or undesirably corrupting the functionality of either region. The AOD is incorporated into the same semiconductor die as the rest of the SOC 158. When both regions are active, the power control block 162 can readily communicate with the processing core 168.

The LPM module 156 of FIG. 4 provides a cooperative interface between the SOC 158 and the power supply module 154 with a straightforward enable/disable control architecture. The power control block 162 has a simple construction with a relatively low complexity of control logic. As depicted in FIG. 4, the SOC 158 provides a single bit (PWR_en) to enact the LPM operation. Multibit configurations are contemplated, such as mask bits to define different regulator states for different operational levels. The power control block 162 is always on as long as host supplies input power to the device to monitor for external inputs to wake up from the LPM by asserting the PWR_en signal or other input to the LPM module 156.

Controlling the reset/power-on sequence can be an important consideration in designing a power system for a device. In the example of FIG. 4, the control signal from the power control block 162 is implemented using a tri-stateable I/O cell. The cell defaults to a tri-stated (no driving of the signal) mode at reset/power on. The power control block 162 powers on the rest of the system via the switch 160, and is generally designed to "fail on" so that, responsive to various inputs, the block automatically restores power to the rest of the system.

It follows that the power control block 162 should be configured to accurately detect wake up commands from various sources and proceed to re-energize the system accordingly. To this end, FIG. 5 is a functional block representation of representative portions of FIG. 4 to illustrate transition from LPM operation to normal operation.

Figure 5:
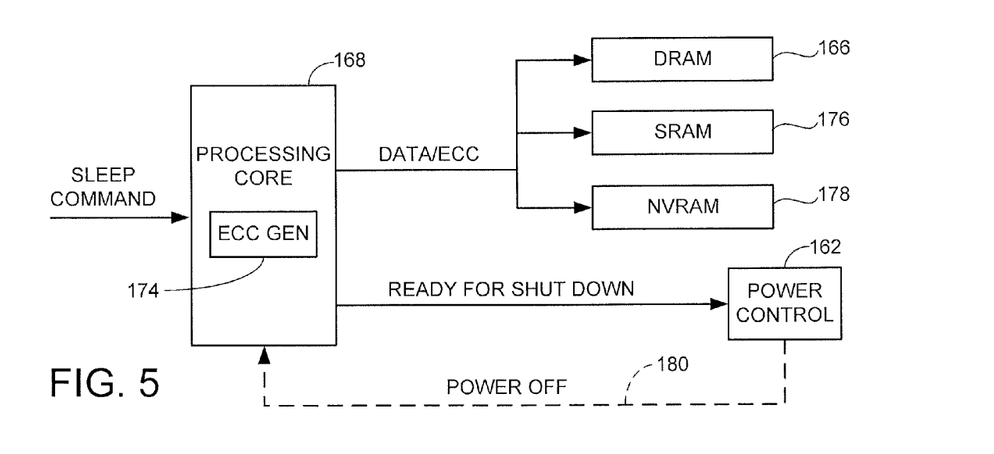
FIG. 5 shows aspects of the circuitry of FIG. 4 in preparation for entering a low power mode.

FIG. 5 provides a functional representation of aspects of the circuitry of FIG. 4 operative to initiate entry into low power mode. A sleep command is issued by the host or other source, and after decoding, is ultimately transmitted to the processing core 168. The core 168 proceeds to identify data that should be stored during the low power mode during which the core is deactivated. In some cases, the processing core 168 may use an error correction code (ECC) generation block 174 to generate ECC data for storage with the data. Example forms and types of ECC data will be discussed below. As noted above, the ECC may be configured as error detection codes (EDC) without the capability of correcting detected errors, or may have the capability of correcting selected numbers of detected errors.

The data (and if used, ECC) are thereafter stored in one or more suitable memory locations. One location may be the external DRAM 166 which, as discussed above in FIG. 4, is continuously powered during the low power mode. Another memory location may be memory internal to the AOD such as volatile static random access memory (SRAM) 176 which also continuously receives power during low power mode. Another memory location may be non-volatile memory 178 such as non-volatile random access memory (NVRAM), flash memory, STRAM, RRAM, PCRAM, etc. Such non-volatile memory may not necessarily require the continued application of power in order to maintain the data stored therein during the low power mode, although voltage fluctuations in control lines coupled to the non-volatile memory may, in some cases, induce voltage disturbances which may lead to data integrity corruption.

The processing core 168 may take other preparatory steps at this time as well, including communications with the host, the sequential shutting down of various components (see e.g., FIG. 2), the completion of existing commands/tasks such as the transfer of data to a main data store (see e.g., FIGS. 2-3), and so on.

Once these preparatory steps are completed, the processing core 168 issues a ready command to the power control block 162 of the AOD indicating that the processing core is ready to shut down. At this point the power control block 162 proceeds to transition the main switch 160 (FIG. 4) to an open position and initiate the low power mode. This results in a power off condition for region B of the SOC 158 as well as remaining portions of the device except for the LPM module 156, the AOD and, as desired, other components that specifically remain powered such as the DRAM 166. This power off path is denoted at 180.

Figure 6:
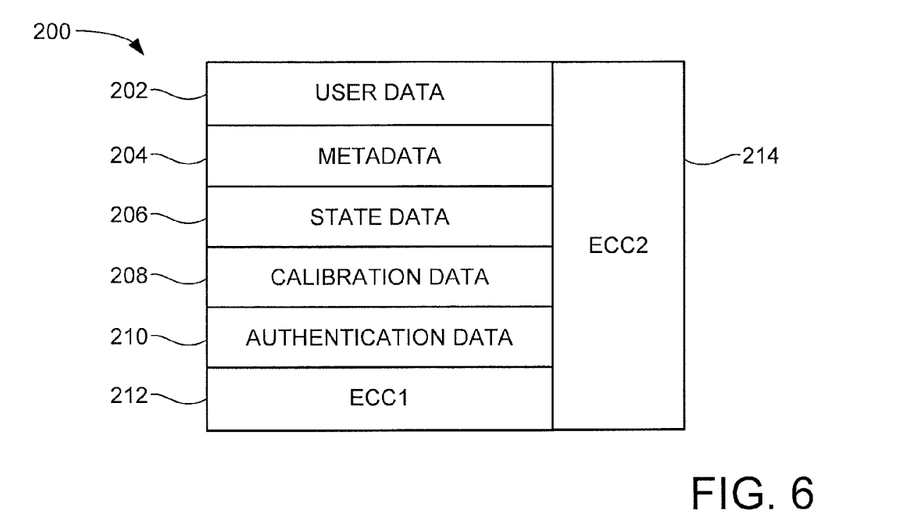
FIG. 6 is a data format for data stored by the circuitry of FIG. 5.

FIG. 6 is a representation of an example format of data that may be stored by the processing core 168 prior to the low power mode. The data are stored in a memory 200 which may correspond to one or more of the memory devices 166, 176, 178 in FIG. 5, or to some other suitable memory device. Blocks of data stored in the memory 200 can include user data 202, metadata 204, state data 206, calibration data 208 and authentication data 210. Other forms of data may be stored as well.

Generally, the user data 202 represents data supplied by the host for storage in the main memory store and may be arranged in the form of addressable data sectors of fixed size. The data may be writeback data supplied to the host which are temporarily maintained in the memory 200 pending subsequent transfer to the main data store at the conclusion of the low power mode period, or cached readback data that are also stored in the main memory store but maintained in a local cache or buffer in anticipation of future data requests.

The metadata 204 can represent control data used by the system to track the locations and statuses of various user data blocks. The state data 206 can represent various state variables and parameters, including but not limited to internal buffer settings used by the processing core 168, programming code (including boot or other initialization code), etc. The state data may also represent various system operational parameters that are nominally monitored and accumulated during system operation (e.g., read counts, write counts, temperature measurements, bit error rate measurements, etc.).

The calibration data 208 may represent calibration parameters obtained on a periodic basis for the system. For example, at each cold reiniitalization some calibration routines may be carried out to set the system for operation in the then-existing environmental conditions. By storing these and other types of calibration data, such routines may be avoided at power up, or may serve as an initial baseline from which new, final calibration values can be obtained quickly.

The authentication data 210 can represent data that are maintained across various power modes, such as host interface data. For example, the device may execute an authentication routine to establish communications with a host device. By storing these values, re-performing the authentication routine(s) upon resumption of normal operation can be avoided.

FIG. 6 further shows the memory 200 to store different types of ECC, in this case ECC 1 and ECC 2. Generally, any number and types of ECC style data can be generated, including but not limited to cyclical redundancy codes (CRC), Reed Solomon (RS) codes, BCH codes, parity values, checksums, IOEDC codes, etc. The error correction codes can be configured to detect and/or correct up to selected numbers of errors in the data. In some cases, multiple directions of coding protection can be provided; for example, the ECC 1 data 212 may protect the data sets 202-210 and then the ECC data 214 may protect the data sets and the ECC 1 data (including combinations of data set portions across these data sets). Collectively, the data (202-214) may be referred to as "system data."

Figure 7:
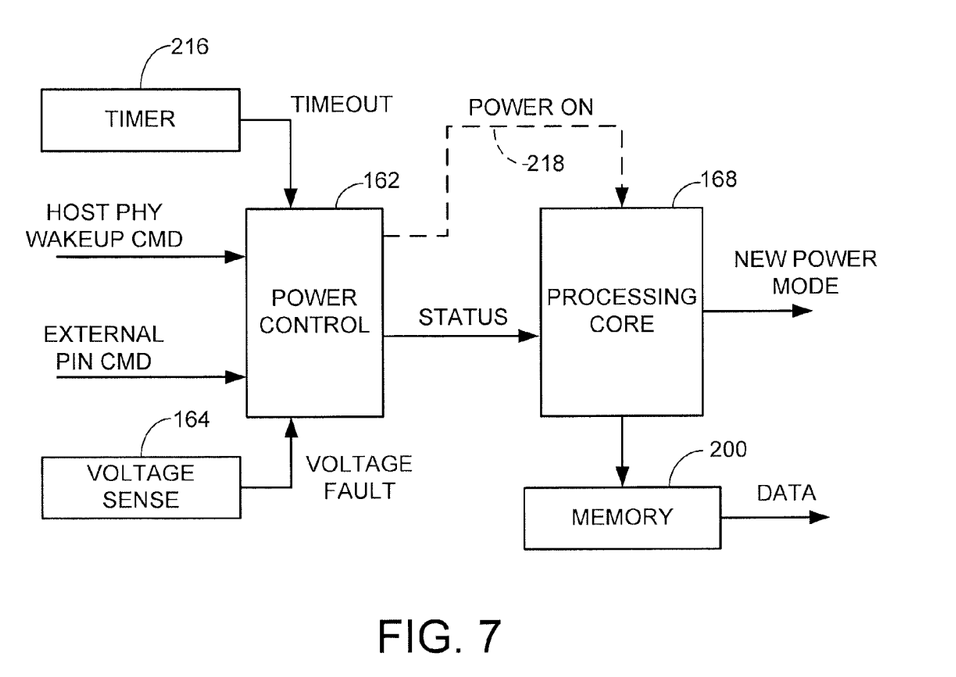
FIG. 7 shows aspects of the circuitry of FIG. 4 at the end of the low power mode.

FIG. 7 depicts relevant portions of the circuitry of FIG. 4 at the conclusion of a low power mode (LPM) period. A variety of inputs can be supplied to transition the system out of LPM operation. In some cases, the host device may send a wake up command to specifically request that the device wake up and return to normal operation. The wake up command may be sent in a variety of ways such as via a host phy (physical interface layer) signal or an external pin. A separate sideband signal can be provided from the host using a dedicated conduit (wire) connected to the device to provide the wake up command.

Additionally or alternatively, a timer signal such as from a timer 216 may signal a resumption of higher mode activity after a selected period of time has been completed during the LPM interval. The timer 216 may be incorporated into the AOD. A detected voltage fault from the voltage sense circuit 164 can also be used to terminate an LPM interval and resume operation of the processing core 168.

Once a wake up event has been detected, the power control block 162 closes the main switch 160 (FIG. 4), thereby supplying power to the rest of the SOC 158 and transferring control to the processing core 168. This power on path is denoted at 218. Status information may be passed from the power control block 162 to the processing core 168 to indicate the form of the wake up event. For example, the status information may reflect the stimulus that caused the system to exit low power mode (e.g., timeout, a voltage fault or a detected host wake up signal). The core 168 can operate based on this status information to select an appropriate set of actions to resume a new power mode for the device.

The host wake up signals can be provided in any number of forms as desired in accordance with the requirements of a given application. It will be appreciated that, because the processing capabilities of the SOC 158 are suppressed during the LPM period, the AOD (Region A) should have sufficient detection capabilities to determine that the host has in fact requested a transition to a different power mode (e.g., a wake up event to resume normal operation).

Figure 8:
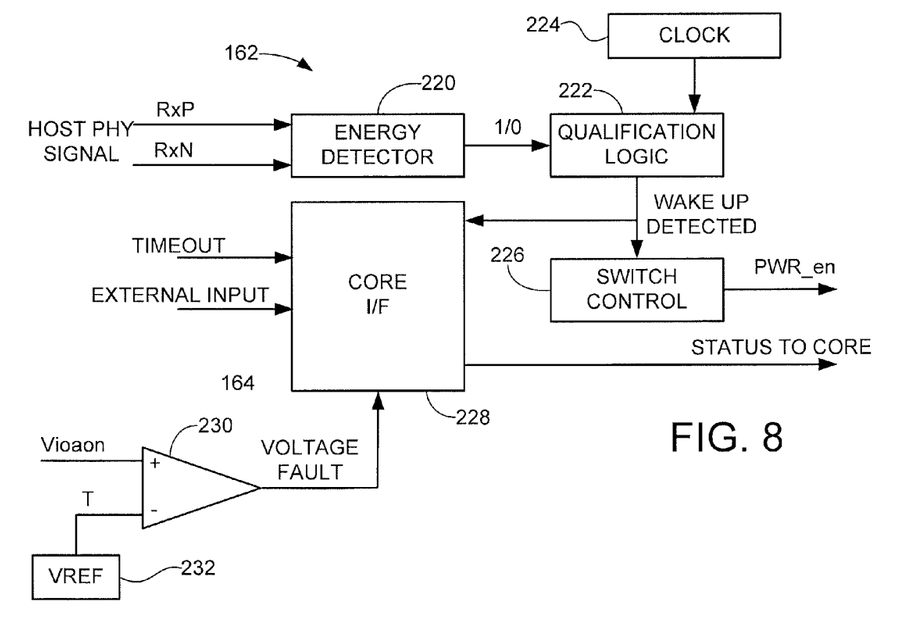
FIG. 8 shows aspects of the circuitry of FIG. 7 in greater detail.

FIG. 8 shows aspects of the circuitry of FIG. 7 in greater detail. In some embodiments, an energy detector 220 of the power circuit 162 monitors one or more input signal lines, such as differential pair host phy signal paths (R×P, R×N) from the host, to detect the presence of energy on these lines.

The energy detector 220 may be configured as a simple voltage sense circuit or may take another configuration. The energy may be detected as a change in differential voltage with respect to a predefined threshold. The energy detector 220 may output a simple single bit: a first level (e.g., logic "0") signal level when no energy disturbances are detected, and a second level (e.g., logic "1") signal when energy disturbances are present.

A qualification logic block 222 of the power circuit 162 can be configured to receive and decode the output sequence from the energy detector 220 to determine whether the detected energy disturbances on the input host line correspond to an intelligible wake up command sequence.

The qualification logic block 222 may utilize clock inputs from an internal clock circuit 224, which may be realized as a relatively low power, relatively high error (ppm) clock circuit. The clock may be a single phase ring oscillator, a voltage control oscillator or other similar construction. It will be appreciated that a lower resolution clock may introduce some potential resolution error in the qualification operation, but beneficially reduces the overall power consumption of the AOD. Moreover, the use of an internally generated clock eliminates the need for an external clock and associated connection inputs and additional power consumption requirements.

The qualification logic block 224 in FIG. 8 operates as a detection circuit to detect and decode the input sequence from the energy detector 220. Timing windows and threshold comparison levels may be applied in order to characterize the input sequence. It is contemplated that disturbances may arise during LPM periods, and the qualification logic block 222 may thus serve to filter out and provide, with a reasonably high level of confidence, when a wake up signal has in fact been transmitted by the host device via the host phy differential pair R×P/R×N or other signal path.

At such times that the qualification logic 222 detects a wake up event, a signal is passed to a switch control block 226, which proceeds to close the main switch 160, thereby re-energizing the system including the SOC 158. The output from the qualification logic block 222 may also be supplied to a core I/F circuit 228, which supplies status information to the processing core 168 (FIG. 4). The status information may, for example, indicate that the power control block 162 has detected a wake up signal from the host, causing the processing core 168 to provide an appropriate response to the host device. In other situations in which the power control block 162 exists the LPM period, the status information may indicate the cause was a voltage fault, a time out event, etc.

The voltage sense circuit 164 of the AOD (FIG. 4) may include a comparator circuit 230 which compares the input voltage Vioaon to one or more threshold voltages T from one or more reference voltage sources 232. Voltage fault indications may be supplied to the core I/F 228 accordingly. In some embodiments, a significantly large voltage fault may cause immediate re-powering of the system to enable the processing core 168 to awaken and resume control, thereby allowing the processing core to select appropriate actions that should be taken at that point.

Figure 9:
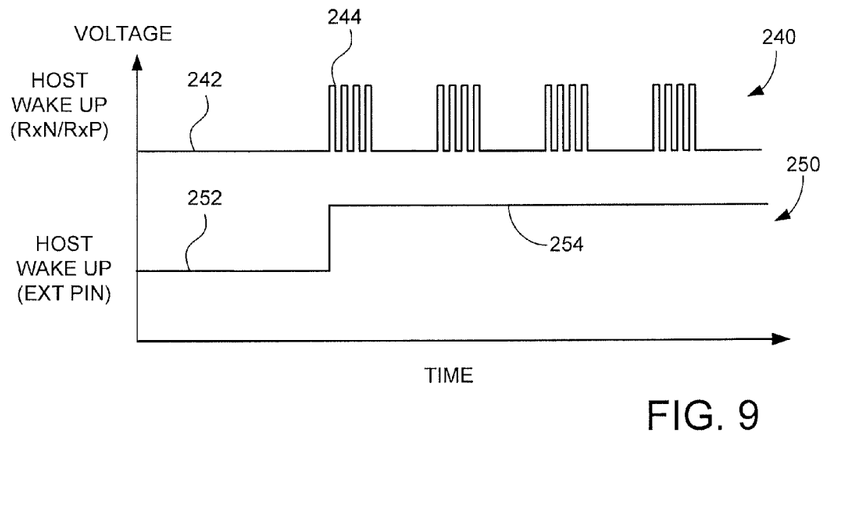
FIG. 9 graphically represents wake up signal formats used by the circuitry of FIG. 7 to exit low power mode.

FIG. 9 is a graphical representation of different types of wake up signals that may be supplied to the power control block 162 from the host device during LPM operation. Other forms of signals can be used. A first signal is denoted at 240 and generally constitutes a differential voltage signal with low (idle) periods 242 and pulse periods 244. In some cases, the pulse periods 244 may include a relatively high frequency component. The frequency component may or may not have in itself intelligible communication information; it may be the presence, location and sequencing of the respective periods 242, 244 that signal the wake up indication. Alternatively, the circuitry can be configured in some cases to decode informational components of the pulses 244 as well.

A power up/power down two-state sideband signal is denoted at 250. The signal may be provided by an external pin and has a low level 252 and a high level 254. Generally, the signal 250 may be a two state signal with one level (such as 252) indicating low power mode and a second level (such as 254) indicating a normal power mode. Detection of a transition in the signal between these two levels thus can serve as an indication of a wake event (and contrawise, a sleep command).

Because the signal 250 only has two states, the signal processing provided by the qualification logic 222 may be unnecessary and so the core I/F circuitry 228 can receive this signal directly as depicted in FIG. 8. It will be understood that in this case, both the blocks 220, 228 operate as energy detectors to detect energy on the input signal path. The configuration of FIG. 8 allows the system to remain in the LPM period until a wake up signal (if received) is qualified so that it is determined, with a reasonable level of confidence, that the host device has in fact requested resumption of normal operation (or some other mode depending on the configuration of the system).

Figure 10:
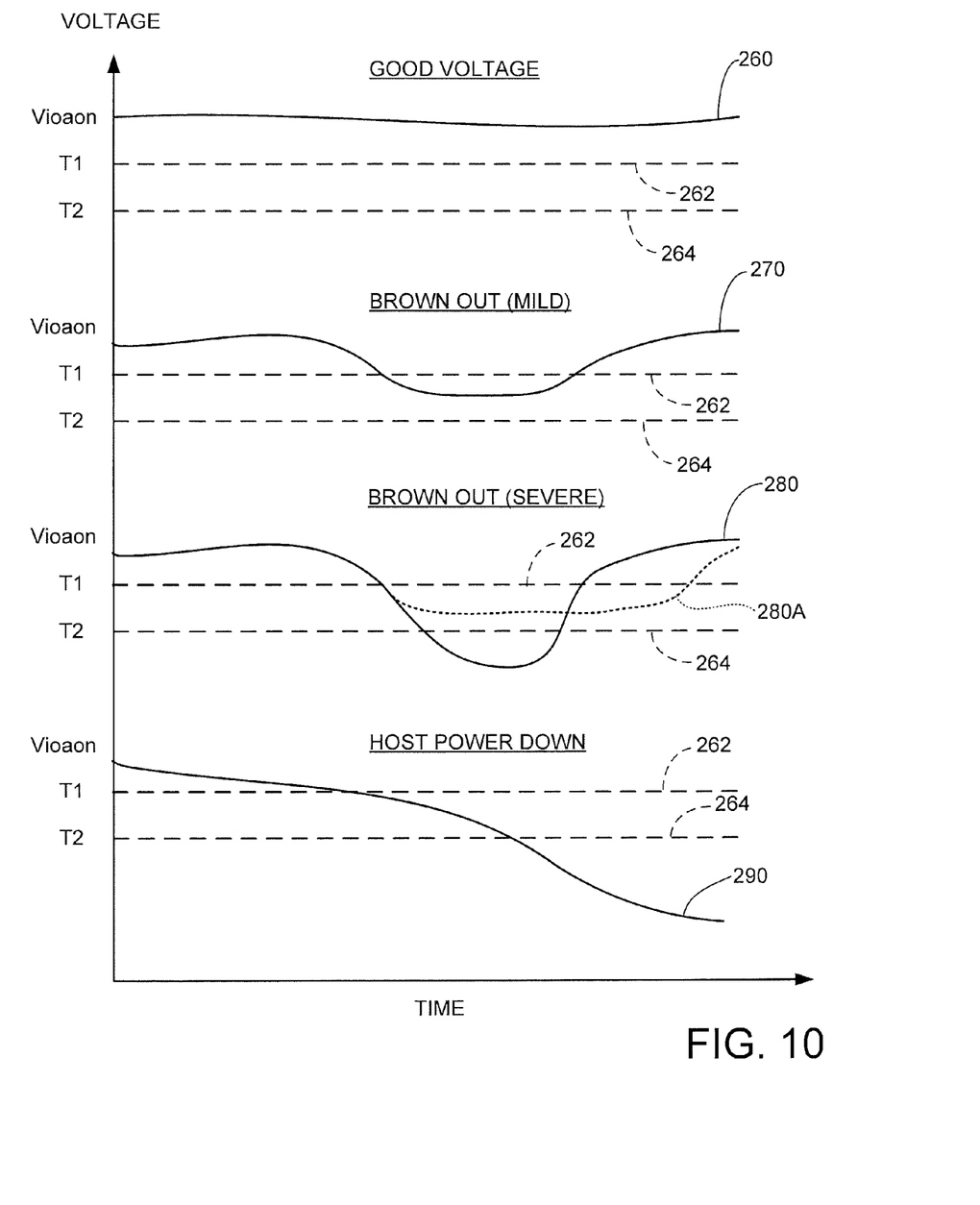
FIG. 10 graphically represents different types of voltage profiles that may arise during the low power mode.

FIG. 10 is a graphical representation of various voltage profiles that may be encountered during low power mode operation. A first Vioaon voltage curve 260 represents the input continuously applied source voltage to the AOD during an interval over which the voltage exhibits relatively good voltage levels. Two voltage thresholds T1 and T2, denoted at 262, 264, may be applied to monitor the magnitude of the voltage curve 260. Any suitable threshold values can be set for these levels, so long as the thresholds are lower than the nominal value of Vioaon. As can be seen from FIG. 10, the Vioaon voltage remains above the thresholds T1, T2. An indication of this fact (e.g., "good voltage") may be communicated to the processing core 168 by the core I/F 228 (FIG. 8) at the conclusion of the LPM period.

A second Vioaon voltage curve 270 is shown to fall below the first threshold T1 (line 262) but not below the second threshold T2 (line 264). This may be characterized as a relatively mild brown-out condition in which the applied voltage temporarily dropped but then resumed normal levels (e.g., above T1). Both the magnitude of the voltage and the duration of the time spent below T1 may be monitored, and both may contribute to characterize the voltage fluctuation as a mild brown out condition.

A third Vioaon voltage curve is denoted at 280. This voltage curve 280 falls below both thresholds T1 and T2 for a time, but recovers in a relatively short amount of time. A companion voltage curve 280A does not cross T2, but spends a longer time below T1. These and other types of voltage fluctuations may be classified as a relatively severe brown out condition.

Finally, a fourth Vioaon voltage curve 290 denotes a host power down operation. The voltage curve 290 crosses both thresholds T1, T2 and remains below such for an extended period of time. The AOD may characterize this as a loss of host power condition, even if the power does subsequently rise back up above one or more of the thresholds.

From FIG. 10 it can be observed that the voltage comparators of the power control block 162 (see e.g., 230 in FIG. 8) can provide inputs to the core I/F 228 which, in response, can classify these and other types of voltage fluctuation events and report the occurrence of the same to the processing core 168 as part of the status information that is communicated after the resumption of power to the SOC 158.

The processing core 168 may take different forms of action based on these status information levels. For example and not by way of limitation, different corrective actions may be taken by the processing core 168 for different types of detected voltage fluctuations. Good voltage and mild brown out conditions may result in the processing core using the stored data (e.g., FIG. 6), whereas a severe brown out condition may cause the processing core to jettison some or all of the stored data and use a more thorough reinitialization routine to restore system operation.

In some cases, the detection of a mild or severe brown out condition may cause immediate resumption of power to the system. Depending upon the severity, some situations may initiate an immediate wake up and exit out of the low power mode whereas other situations may cause the power control block 162 to log the event and report it to the processing core 168 at the end of the low power mode.

A detected host power down event may cause the power control block 162 to specifically not attempt a wake up of the SOC 158 on the basis that, if the voltages have dropped sufficiently, some sort of error condition or host shut down has been initiated. Thus, the wake up features of the AOD can be set to specifically not attempt to resume power at a time when it is anticipated that the host is shutting down the device.

Figure 11:
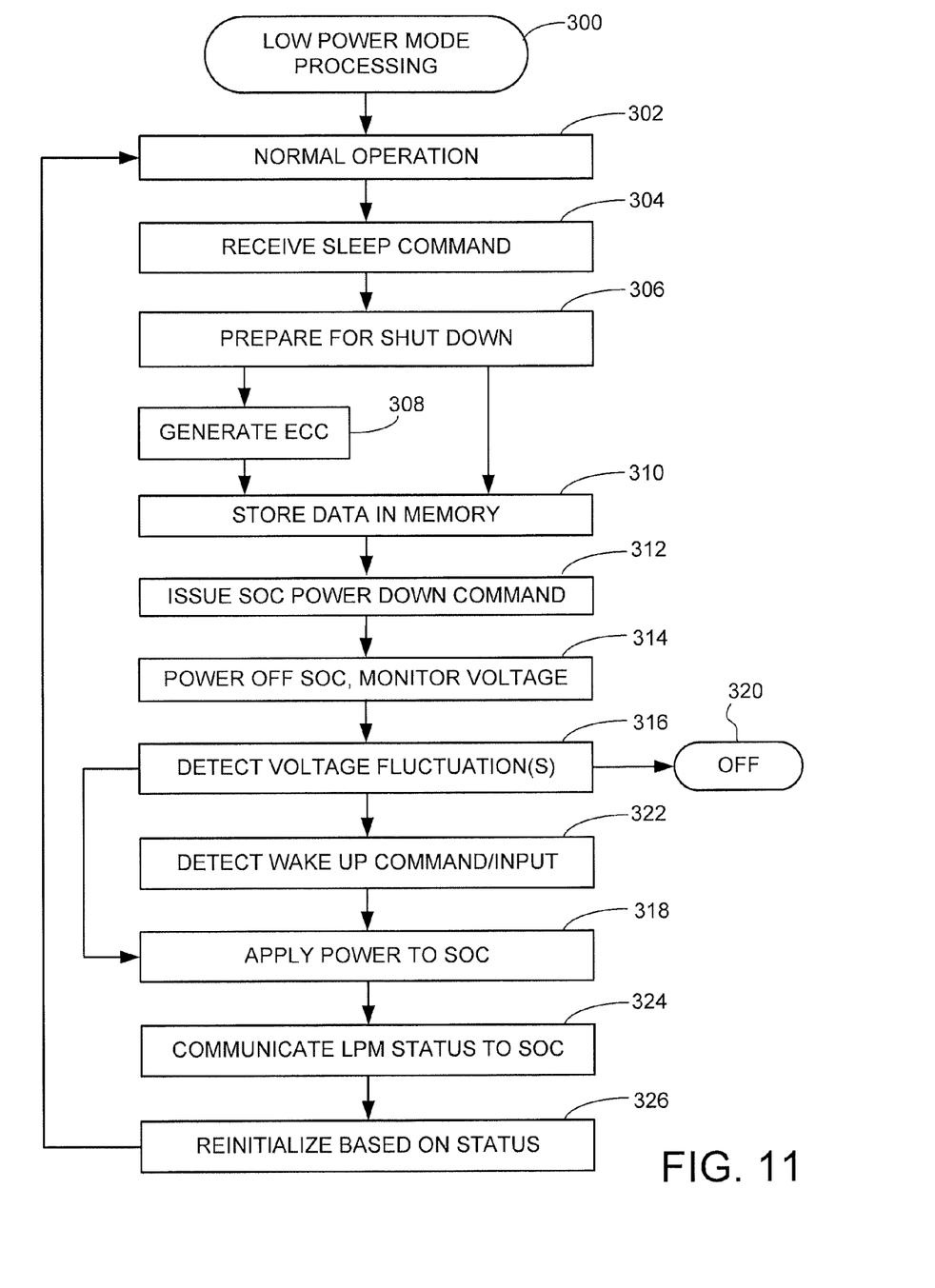
FIG. 11 is a flow chart for a low power mode processing routine illustrative of steps carried out in accordance with some embodiments.

FIG. 11 is a flow chart for a low power mode processing routine 300 illustrative of steps carried out in accordance with the foregoing discussion. It will be appreciated that the flow chart is merely for purposes of illustrating a particular example and is not limiting. Various steps can be modified, omitted and/or added as required by a given application. For purposes of the present discussion, it will be contemplated that the routine is carried out by the circuitry of FIGS. 4-5, 7-8 as embodied in the storage device 110 of FIG. 2. Other environments can be readily used.

At step 302, the storage device 110 operates in a normal mode of operation. During this normal mode, host access (e.g., read and write commands) are serviced to transfer data between the host device and the storage medium 116. At some point a sleep command is received at step 304. As discussed above, the command may be host generated, or may be a result of a self-sleep mode in which the device places itself into a reduced mode responsive to a lack of host I/O activity or some other condition that warrants a low power mode of operation.

The processing core 168 of the SOC (e.g., controller 111) initiates preparation for entry into the low power mode, step 306. This may involve a variety of steps as discussed above, including the identification of data (see e.g., FIG. 6) to be stored in memory during the LPM period. As desired, ECC data may be generated as depicted by step 308, and the data (including ECC if used) are stored at step 310. Other steps may be carried out under the direction of the controller 111 at this time, such as the powering down of various loads within the system (e.g., spindle motor, etc.).

Once the processing core portion of the SOC is ready to power down, a ready command is issued to the AOD, step 312. This results in the powering off of the region B portion of the SOC 158 and entry into the LPM, step 314. The power control block 162 thereafter initiates the monitoring for various input signals, such as a wake up signal and voltage fluctions in the continuously supplied voltage.

Voltage fluctuations during the low power mode interval, if any, are detected at step 316. If moderate in nature, the presence and extent of the fluctuations may be logged and the LPM will continue its monitoring function. If the voltage fluctuations are more extensive in nature, the power control block 162 may immediately apply power to the SOC 158 by closing the main switch 160, as shown at step 318. If the voltage fluctuation indicates a power off condition, no further steps are taken as indicated at 320.

At some point a wake up command or input may be detected, as shown by step 322. This causes the routine to pass to step 318 where system power is resumed, as noted above. The power control block 162 next communicates status information to the processing core 168 of the SOC 158 at step 324. This status information can take a variety of forms and can include the form and type of the wake up event that was detected, the number and extent of voltage fluctuation events that were encountered, and so on. Other parameters can be monitored and reported as well, such as temperature data, elapsed time of the LPM period, etc.

The processing core 326 thereafter reinitializes the device at step 326 in response to the status information. This may include different levels of initialization (e.g., warm boot v. cold boot) based on the reported status. In some cases, the presence of voltage fluctuations may pose an unacceptably high potential of data corruption in the memory or memories used to store the data prior to the LPM period, causing the processing core to jettison such data and not use such during restoration of system operation. In other embodiments, higher levels of available ECC may be applied to the data to ensure data integrity based on the status information.

The use of volatile memory can advantageously provide security features since, upon loss of power, the contents will generally not persist and therefore remain unavailable for use during a subsequent reinitialization operation by the processing core. The use of internal volatile memory further provides enhanced security since the memory will be located within the SOC 158 and therefore communication paths to the memory will generally be unavailable for detection of signals or other communication signals indicating the contents thereof.

From the foregoing discussion it can be seen that the various embodiments disclosed herein can provide a number of benefits. Power consumption levels in the disclosed LPM may be significantly lower than other previously achievable levels. In some cases, power consumption of a hard disc drive (HDD) configured as disclosed herein has been found to be reduced to a range of about 12.5 mW, which is about an order of magnitude less than what was otherwise achievable by maintaining the SOC in a powered state (e.g., about 10 mW v. 100 mW or more). Upon wake up, the processing core may elect to enter any suitable power state, including normal operational mode or some other power mode including transitioning to a power off mode. For example, the processing core may elect to perform a full reset or reinitiate a power down mode so that it goes back to an unpowered state based on status information supplied to the core from the AOD.

The system as disclosed also provides enhanced reliability, in that requests to power down the system can be ignored if a voltage fault condition is present or has been detected. The system firmware is in charge of determining exactly when LPM is entered, and so the firmware can defer entry until safe entry can be achieved. The status of the low power mode can be reported to the system as it wakes up, allowing the system to take an appropriate reset approach (e.g., cold or warm reboot, etc.). The use of energy detection circuitry and, as desired, qualification logic at the AOD power island level can ensure improved detection of actual wake up requests by the host, leading to improved response times by a device.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising:
   a memory; and
   a system on chip (SOC) integrated circuit comprising a first region having a processing core and a second region electrically isolated from the first region and comprising an always on domain power island with a power control block, the processing core configured to, responsive to receipt of a sleep command, transfer system data to the memory followed by the power control block opening a main switch to transition from a normal operational mode to a low power mode during which no electrical power is supplied to the first region and electrical power is continuously supplied to the second region, the power control block further configured to monitor the electrical power supplied to the second region during the low power mode and, responsive to receipt of a wake up command, close the main switch to resume application of electrical power to the first region and communicate status information to the processing core, the processing core further configured to perform a reinitialization operation to transition back to the normal operational mode responsive to the status information communicated to the processing core from the power control block, the processing core utilizing the transferred system data in the memory during the reinitialization operation responsive to the status information indicating a lack of a voltage fluctuation in the monitored electrical power, the processing core not utilizing the transferred system data in the memory during the reinitialization operation responsive to the status information indicating a presence of a voltage fluctuation in the monitored electrical power, the memory characterized as a volatile memory adapted to continuously receive power during the low power mode from a power supply module that also supplies the electrical power to the power control block, the power control block indicating the presence of a voltage fluctuation in said electrical power responsive to a voltage of the electrical power falling below a threshold determined to potentially corrupt the system data stored in the volatile memory.

2. The apparatus of claim 1, further comprising a first power supply module adapted to intermittently apply voltage to the first region and a second power supply module adapted to continuously supply voltage to the second region, the main switch operative to interrupt application of said voltage to the first region from the first power supply module responsive to the main switch being in an open position.

3. The apparatus of claim 2, in which the power control block monitors the voltage from the second power supply during the low power mode and the status information communicated to the processing core from the power control block indicates a presence or an absence of a detected voltage fluctuation during said monitoring of the voltage by the power control block.

4. The apparatus of claim 1, further comprising a power supply module which continuously supplies the electrical power to the second region during the low power mode, wherein the memory is an external volatile memory, and wherein the power supply module further continuously supplies power to the external volatile memory during the low power mode.

5. The apparatus of claim 1, in which the memory is an internal volatile memory within the second region.

6. The apparatus of claim 1, in which the processing core further operates to generate error correction code (ECC) data and store the ECC data in the memory in preparation of entry into the low power mode, the ECC data enhancing integrity of the system data in the memory.

7. The apparatus of claim 1, in which the second region further comprises a voltage sense circuit which applies at least one threshold level to an input voltage from a power supply module that continuously supplies power to the second region during the low power mode, the voltage sense circuit detecting an occurrence of at least one voltage fluctuation responsive to a magnitude of the input voltage and the at least one threshold level, wherein the power control block identifies the occurrence of the at least one voltage fluctuation to the processing core in the communicated status information.

8. The apparatus of claim 6, in which the power control block identifies a plurality of different voltage fluctuation classifications responsive to different levels of voltage fluctuation detected during the low power mode, and in which the processing core performs different reinitialization routines for each of the plurality of different voltage fluctuation classifications.

9. The apparatus of claim 1, in which the wake up command is generated responsive to a voltage fluctuation sensed by the power control block during the low power mode, and the reinitialization operation by the processing core is carried out responsive to the voltage fluctuation.

10. The apparatus of claim 1, in which the status information comprises a duration of the low power mode communicated to the processing core.

11. The apparatus of claim 1, in which the second region comprises an energy detector adapted to detect a host wake up command signal responsive to a presence of energy on an input host signal path separate from a power supply path along which the electrical power is continuously supplied to the second region during the low power mode.

12. A method comprising:
connecting a system on chip (SOC) integrated circuit to a power interface, the SOC comprising a first region having a processing core and a second region electrically isolated from the first region as an always on domain power island, the power interface comprising a first power supply module adapted to selectively apply first power to the first region and a second power supply module adapted to continuously supply second power to the second region, the second power supply module comprising a main switch between the first power supply module and a host input voltage terminal;
using the processing core to transfer system data to a volatile memory responsive to receipt of a sleep command during a normal operational mode;
transitioning from the normal operational mode to a low power mode by opening the main switch to remove further application of power to the processing core;
monitoring a voltage level of the second power supplied to the second region during the lower power mode;
exiting the low power mode by subsequently closing the main switch to resume application of electrical power to the first region;
communicating status information to the processing core from the power control block indicative of a state of the system during the low power mode, the status information indicating a presence or an absence of a fluctuation of the monitored voltage level of the second power with respect to a selected voltage threshold sufficient to potentially corrupt the system data stored in the volatile memory, the volatile memory continuously receiving power from the second power supply module during the low power mode; and
reinitializing the SOC responsive to the communicated status information to transition from the low power mode to the normal operational mode, the reinitializing step comprising using the transferred system data from the volatile memory to reinitialize the SOC responsive to the status information indicating the absence of a detected voltage fluctuation in the second power during the low power mode, and not using the transferred system data from the volatile memory to reinitialize the SOC responsive to the status information indicating the presence of a detected voltage fluctuation in the second power during the low power mode.

13. The method of claim 12, in which the memory is an external volatile memory to which the second power supply module continuously supplies power during the low power mode.

14. The method of claim 12, in which the memory is an internal volatile memory within the second region and which continuously receives power during the low power mode from the second power supply module.

15. The method of claim 12, in which the using step comprises generating and storing error correction code (ECC) data in the memory in preparation of entry into the low power mode to enhance integrity of the system data in the memory.

16. The method of claim 12, in which the status information further indicates a duration of time during which the monitored voltage level of the second power was below the selected voltage threshold.

17. A system comprising:
a power supply comprising a first power supply circuit, a second power supply circuit and a main switch between the first and second power supply circuits, the second power supply circuit configured to receive an input voltage from a host input voltage terminal;
a system on chip (SOC) integrated circuit comprising a first region having a processing core and a second region having a power control block, the second region electrically isolated from the first region as an always on domain power island, the first power supply circuit adapted to selectively apply first power to the first region from the host input voltage terminal responsive to a conductive state of the main switch, the second power supply circuit adapted to continuously supply second power to the second region from the host input voltage terminal irrespective of the conductive state of the main switch; and
a memory connected to receive electrical power from the host input voltage terminal by way of the second power supply circuit;
the processing core configured to, responsive to receipt of a sleep command, transfer system data to the memory;
the power control block configured to, responsive to the sleep command, open the main switch to remove the first power from the first region and transition the system from a normal operational mode to a low power mode;
the power control block further configured to, responsive to the low power mode, monitor the second power during the low power mode;
the power control block further configured to, responsive to receipt of a subsequent wake command, close the main switch to reapply the first power to the first region and to communicate status information to the processing core indicative of a presence or an absence of a voltage fluctuation detected in the monitored second power;
the processing core further configured to, responsive to the status information, reinitialize the system to transition from the low power mode to the normal operational mode, the processing core configured to reinitialize the system using a warm boot by using the system data stored in the memory during the transition from the low power mode to the normal operational mode responsive to the status information indicating the absence of a voltage fluctuation in the monitored second power, the processing core configured to reinitialize the system using a cold boot by not using the system data stored in the memory during the transition from the low power mode to the normal operational mode responsive to the status information indicating the presence of a voltage fluctuation in the monitored second power, wherein the memory is a volatile memory and the presence of a voltage fluctuation is determined responsive to the voltage of the second power reaching a predetermined threshold determined to be sufficient to potentially corrupt the system data stored in the memory, the memory continuously receiving power from the second power supply circuit during the low power mode.

18. The system of claim 17, wherein the processing core is further configured to generate error correction code (ECC) data to protect an integrity of the system data and to store the ECC data in the memory prior to transitioning to the low power mode.

* * * * *